United States Patent [19]

Mathisen et al.

[11] Patent Number: 5,322,539
[45] Date of Patent: Jun. 21, 1994

[54] QUARTZ TANK MEMBER AND METHOD OF PRODUCTION THEREOF

[75] Inventors: Melvin P. Mathisen; David L. Butler; Jeffrey F. White, all of Colorado Springs, Colo.

[73] Assignee: Desert Glassworks, Inc., Colorado Springs, Colo.

[21] Appl. No.: 905,290

[22] Filed: Jun. 26, 1992

[51] Int. Cl.5 .......................................... C03B 23/023
[52] U.S. Cl. .......................................... 65/42; 65/54; 65/61; 65/104; 65/106; 65/DIG. 8; 220/416; 220/678
[58] Field of Search ...................... 65/41, 106, 36, 42, 65/104, 54, 61, DIG. 8; 220/678, 416

[56] References Cited

U.S. PATENT DOCUMENTS 2,389,601  11/1945  DeWitt ............................... 220/678
4,142,881   3/1979  Louis ............................. 65/DIG. 11
5,054,210  10/1991  Schumacher .......................... 34/78

FOREIGN PATENT DOCUMENTS

3177325  8/1991  Japan .

Primary Examiner—W. Gary Jones
Assistant Examiner—John M. Hoffmann
Attorney, Agent, or Firm—Phillip A. Rein

[57] ABSTRACT

A quartz tank member produced by a new method of production having continuous inner corner surfaces formed through bending and welding processes with welded seams being smooth without any hills, valleys, pits, crevasses, or irregularities therein. The method of production of the quartz tank member involves the steps of 1) heating a quartz plate along a predetermined area to create a bent corner; 2) annealing to remove stresses created in the heating step; 3) repeating the steps of applying heat, bending and annealing to create a plurality of bent corners; 4) welding of abutting corner edges at the bent corners through use of quartz welding rods and a quartz torch assembly forming welded beads; 5) grinding of the unique welded beads on interior and exterior surfaces; 6) fire polishing the quartz tank member to remove oxidation residue created during the welding process step; 7) annealing the quartz tank member after the fire polishing process step to remove stresses; and 8) inspecting the quartz tank member, particularly in the quartz rod welded areas to assure that no hills, valleys, pits, cracks, or irregularities are contained therein.

10 Claims, 5 Drawing Sheets

QUARTZ TANK MEMBER AND METHOD OF PRODUCTION THEREOF

PRIOR ART

A patent search was not conducted on this invention.

Figures 1, 2, 3A, 3B, 3C:
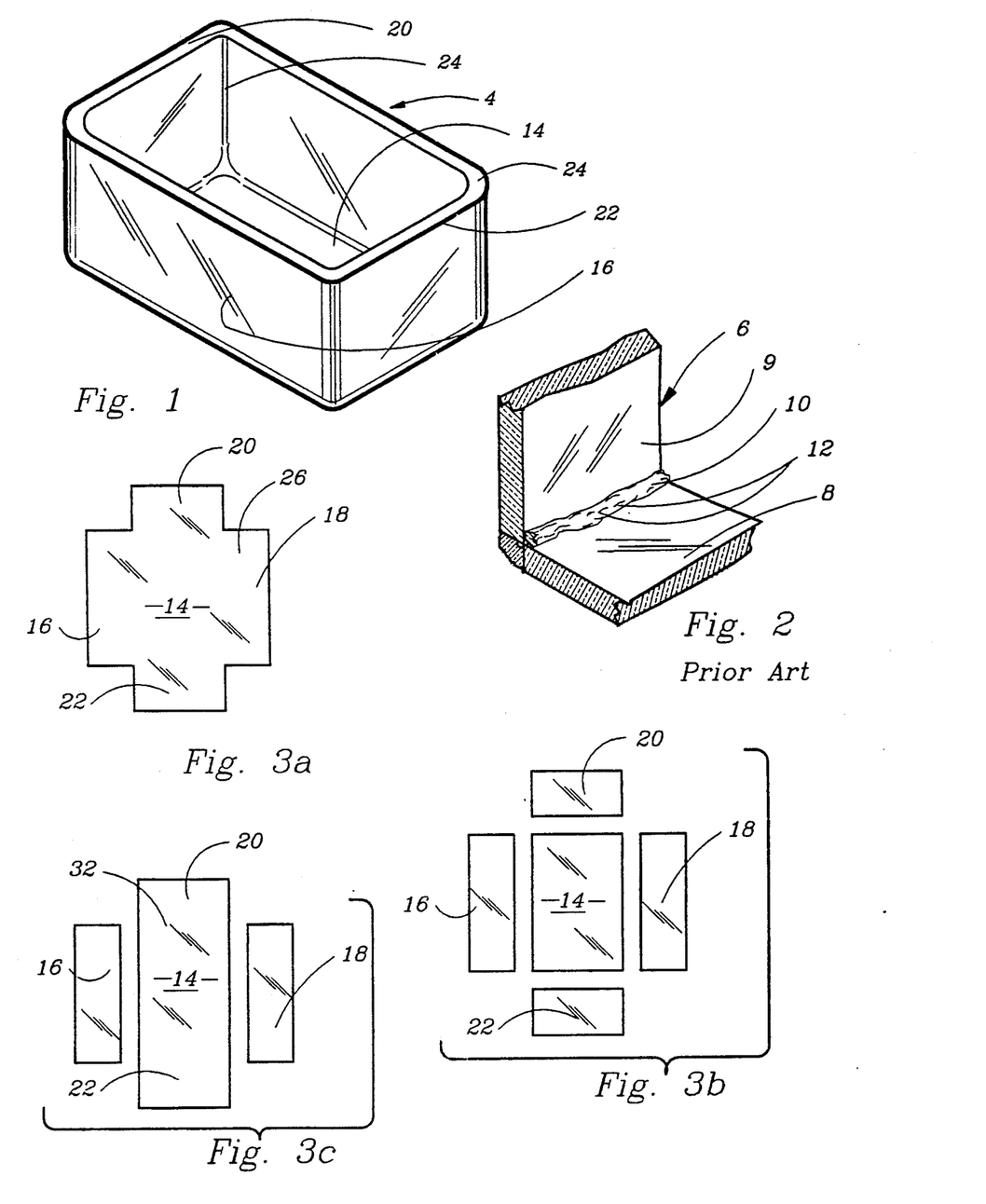
FIG. 1 is a perspective view of a quartz tank member produced by a method of production of this invention.
FIG. 2 is a fragmentary cross sectional view of a welded seam construction achieved by the process of manufacturing a prior art quartz tank member.
FIG. 3a is a top plan view of a quartz plate member utilized in production of the quartz tank member.
FIG. 3b is a top plan view illustrating use of a central bottom member with separate side wall and end wall members of quartz plate to be welded together.
FIG. 3c is a top plan view utilizing central bottom, and end wall members to be bent and side wall members to be welded thereto.

It is well known in the prior art to produce quartz tank or container members for use in a computer chip or wafer manufacturing process as set forth in this invention but the prior art utilized a base member with separate side wall members and end wall members with the subject side wall and end wall members each being of a separate piece as noted in FIG. 3b.

The prior art method of production then utilizes a quartz heating torch and quartz glass welding rods in order to weld the subject side wall members and end wall members to the base member and to each other. The welding steps are followed by an annealing process but there was no use of a grinding tool or bending corners to eliminate numerous welding steps which is set forth in the applicants' invention. Therefore, in the production of the prior art quartz tank member, there is required a minimum of eight welded seams therein which are produced with considerable time and labor involved.

With no bending or grinding steps in the prior art, the quartz tank members are formed with irregular welded seams having numerous hills, valleys, and crevasses adjacent the subject side wall members and end wall members. These hills, valleys, and crevasses are areas which would trap impurities therein regardless of the intensity of cleaning the finished product after usage.

During the semiconductor industry manufacturing of the silicon wafer assemblies, the impurities trapped in the hills and valleys of the final welded seams of the prior art would contaminate the computer wafer assembly and chips mounted thereon. When this contamination occurs as found in subsequent inspection thereof, this results in a contaminated unit which cannot be utilized nor repaired.

Therefore, in the prior art, on use of the quartz tank members, this contamination becomes a very important consideration as the size of the computer wafer assemblies are increasing and, therefore, the monetary loss from a contaminated wafer assembly cannot be economically tolerated in the semiconduct industry.

For example, the smaller silicon wafer assemblies may entail an expense of $200.00 and the loss thereof due to contamination was not as great as in today's industry whereupon larger silicon wafer assemblies are constructed and the loss may be $600.00 or more. The invention set forth herein is to virtually eliminate such loss of silicon wafer assemblies due to the trapping of impurities in the seams or weld on subsequent use thereof.

PREFERRED EMBODIMENT OF THE INVENTION

In one preferred embodiment of a quartz tank member and method of production of this invention, the final product is the quartz tank member as noted in FIG. 1 having a minimum amount of welded seams due to a new and novel process and a new and novel bending new and novel and grinding process of this invention.

As noted in FIG. 1, the quartz tank member would have a maximum of four welded seams at upright corners and upright bent side wall members and end wall members with smooth, contoured welded seam.

Figures 4, 5, 6A, 6B, 6C, 6D:
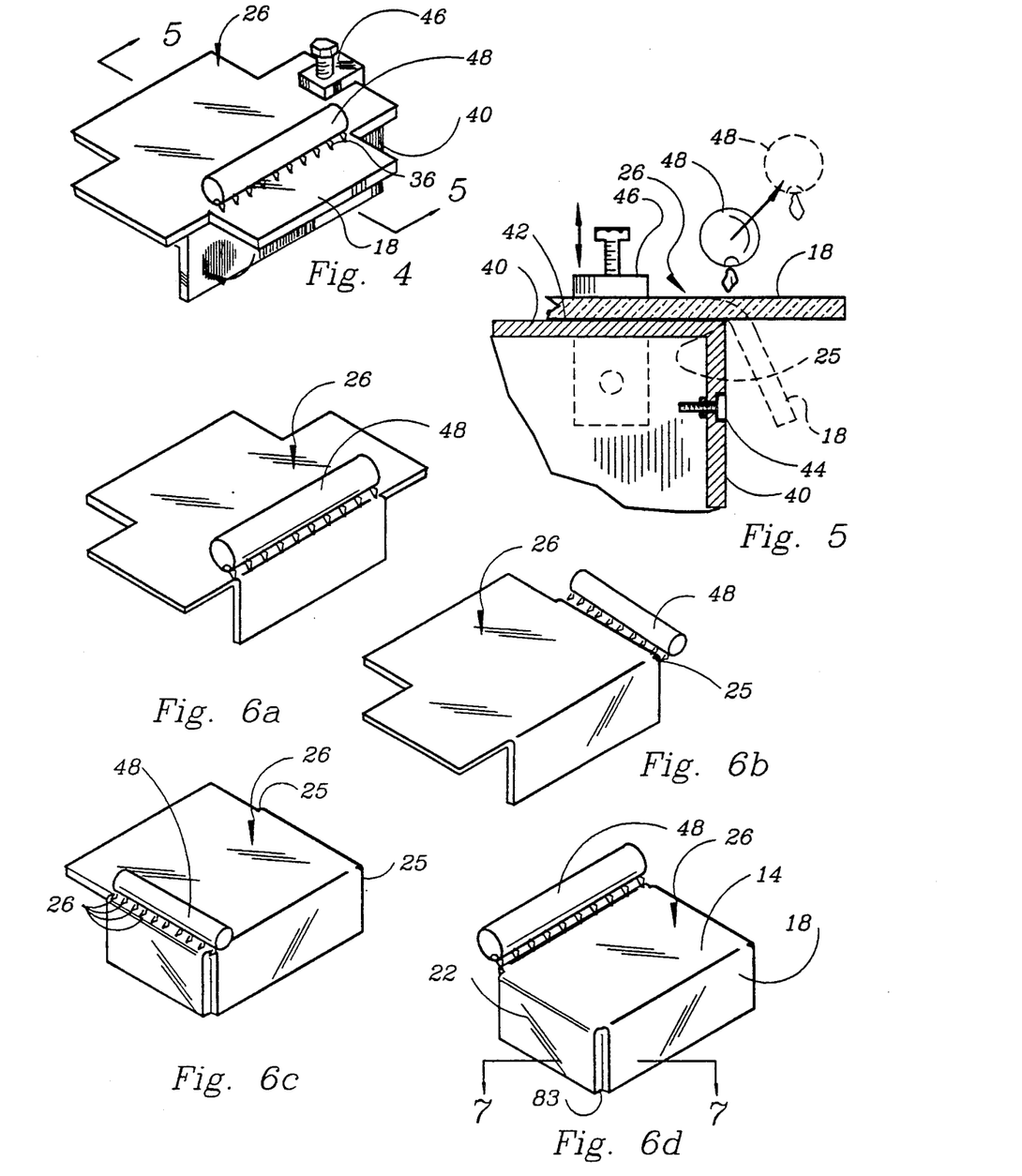
FIG. 4 illustrates the quartz sheet member of FIG. 3a in a first folding process.
FIG. 5 is a fragmentary sectional view of a support table having the quartz sheet member mounted thereon during the bending process step.
FIG. 6a is a perspective view showing the quartz plate member having one bent corner.
FIG. 6b is a view similar to FIG. 6a illustrating two bent corners.
FIG. 6c is a view similar to FIG. 6b illustrating three bent corners.
FIG. 6d is a view similar to FIG. 1 having four bent corners.
Figure 9A:
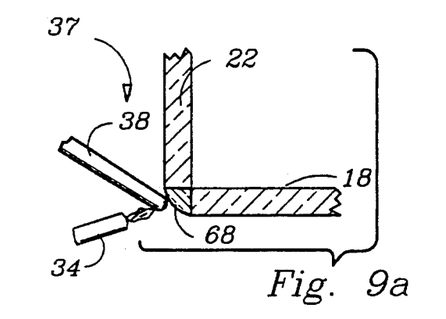
FIG. 9a is the sectional view of FIG. 7 illustrating a first welding process step.
Figure 9B:
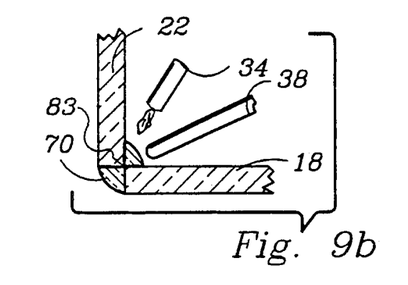
FIG. 9b is the sectional view of FIG. 9a illustrating a second process step.
Figure 9C:
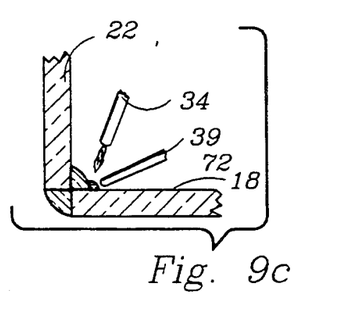
FIG. 9c is the sectional view of FIG. 9b illustrating a third process welding step.
Figure 9D:
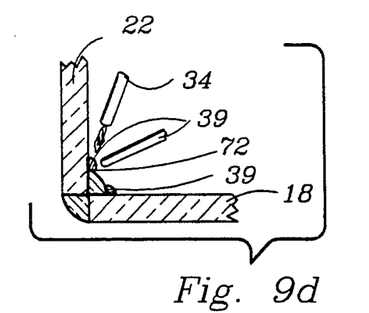
FIG. 9d is the sectional view of FIG. 9b illustrating a fourth process welding step.

The method steps of this invention entail the following:

1) obtaining a sheet of quartz plate or a plurality of pieces thereof to be welded together as noted in FIGS. 3a, 3b, and 3c;

2) mounting the quartz plate on an adjustable and support indexing table to place an edge of the quartz plate in a particular location for subsequent folding thereof as noted in FIG. 5;

3) applying a heat source from a quartz heating torch tool of special design in order to uniformly apply a continuous heat flame along an aligned area to bent as noted in FIG. 4;

4) removing the heat source on the quartz plate along the aligned area as the end wall members or side wall members fall under gravity and engages an adjustable stop member on the adjustable support and indexing table to achieve a 90 degree fold relative to a bottom wall member;

5) annealing the bent corner in an annealing oven at a high temperature to relieve any stress formed therein from the first bending process;

6) repeating the steps of mounting, heating, and bending along another area to be formed, as a corner of the quartz plate to achieve a second bending operation as noted in FIG. 6b and annealing the bent area to remove stresses therein;

7) repeating the aforementioned mounting, heating, bending and annealing process steps as required which would achieve a bent corner structure as noted in FIG. 6d;

8) welding with quartz welding rods of the bent adjacent corner edges as noted in FIG. 7 and proceeding with proces steps as follows:

a) applying a welded bead with a large diameter glass welding rod between outer, abutting corners of a side wall member and an end wall member with the use of a glass torch assembly as noted in FIG. 9a;

b) applying a large bead to interior abutting upright corners of the end wall members and the side wall members with use of the quartz torch assembly and a large diameter quartz welding rod member as noted in FIG. 9b;

c) applying a small bead to one side of a large welding bead as applied in FIG. 9a through a smaller diameter glass welding rod and the quartz torch assembly as noted in FIG. 9c;

d) applying a second one of the smaller diameter quartz welding rods with use of the quartz heating torch to an opposite side of the large central bead to form a small bead as noted in FIG. 9d; and    e) applying heat from the quartz heating torch to abutting ones of the small beads and the large bead to achieve an integral, irregular bead member as shown in FIG. 9d. The shape formed thereby is important on applying a grinding step in order to achieve a continuous, smooth arcuate corner portion therein without leaving areas of hills, valleys, and cracks to trap impurities and contaminants.

Figure 9E:
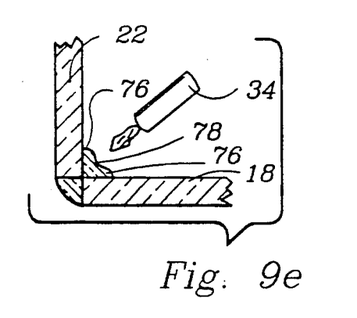
FIG. 9e is the sectional view of FIG. 9d illustrating a fourth process welding step.

9) grinding the irregular bead member achieved in FIG. 9e through a hand grinding tool assembly with a diamond ball head thereon at each upright corner welded seam and other welded seams formed in the manufacturing process. This grinding step includes the use of a belt sander member and/or a lapping wheel assembly against outer surfaces of the corner welded seams (FIG. 9a) to remove any irregularities there as noted in FIG. 10. The completion of the grinding operation achieves a smooth inner and outer upright corner edge construction as noted in FIG. 11;

10) polishing through a fire polishing process known in the prior art whereupon the quartz torch assembly is utilized to heat inner and outer surfaces of the side wall members and the end wall members to remove white oxides formed thereon from the welding step (item 8) above) to achieve a clear glass appearance without contaminants thereon.

11) annealing the completed welded quartz tank member to remove all stresses therein which may have occurred during the fire polishing process step; and 12) inspecting the final product, being the quartz tank member, for any hills, valleys, or irregularities, especially in the interior weld surfaces which must be smooth for use in manufacturing of the silicon wafer assemblies to prevent contamination thereof.

The final quartz tank member produced by the new and novel process of this invention has achieved acceptance in the manufacturing of the silicon wafer assemblies by eliminating failures due to contamination.

OBJECTS OF THE INVENTION

One object of this invention is to provide a method of production of a quartz tank member constructed from a quartz plate involving the steps of bending, welding, grinding, heating, and annealing to achieve a final product having smooth inner surfaces of an arcuate shape at the area of welding having no irregularities, pits, or crevasses which would receive and trap impurities and contaminants therein which cannot be tolerated in the production of silicon wafer assemblies in the field of computer manufacturing.

Another object of this invention is to construct a quartz tank member having an interior surface without hills, valleys, and irregularities which has not been achieved in the prior art.

One other object of this invention is a method of production of a quartz tank member involving a step of bending of a quartz plate through the use of a continuous heat along an aligned area to be folded by use of a specially designed quartz heating torch tool.

Another object of this invention involves a method of production of a quartz tank member involving the steps of bending a quartz plate along a predetermined aligned area to provide an arcuate continuous corner which eliminates any possibility of trapping impurities and contaminants in this area.

One further object of this invention is to provide a method of production of a quartz tank member from a quartz plate involving the steps of 1) bending the quartz plate along an aligned area by applying an intense heat source thereto; 2) annealing the folded quartz plate after each folding process step; 3) welding each abutting outer edge portion through use of a quartz welding rod and quartz torch assembly; 4) annealing each welded seam to remove stresses in the quartz plate; 5) grinding each interior and exterior surface of the welded seams to achieve continuous arcuate smooth inner and outer surfaces; 6) fire polishing surfaces of the quartz plate adjacent area which have been subjected to the aforementioned welding process to achieve a clear glass condition; and 7) inspecting the final product quartz tank member to assure presence of a continuous smooth surface in the welded seam areas without any hills, valleys, pits, or crevasses present.

Still, one other object of this invention is to manufacture a quartz tank member by a method of production which is unique and achieving a high quality product not previously obtainable in any prior art manufacturing process.

Various other objects, advantages, and features of the invention will become apparent to those skilled in the art from the following discussion, taken in conjunction with the accompanying drawings, in which:

FIGURES OF THE INVENTION

The following is a discussion and description of preferred specific embodiments of the invention of the quartz tank member and method of production thereof, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

The end result of the method of production of this invention is to produce a quartz tank member, indicated generally at 4 in FIG. 1.

A cross sectional view of a prior art quartz tank member 6 is shown in FIG. 2 formed with a base member 8 secured to an abutting side wall 9 by use of a prior art welded seam 10.

The welded seam 10 is a finished connection with numerous defects, such as hills, valleys, pits, and irregularities therein, indicated generally at 12. The defects 12 cause considerable problems with impurities and contamination during a silicon wafer manufacturing process of etching, final rinsing, etc. of silicon wafer assemblies with the quartz tank member 6.

The quartz tank member 4 includes a bottom wall member 14 integral with side wall members 16, 18 and end wall members 20, 22 which are welded at abutting edges.

The quartz tank member 4 is formed with welded seams 24 at each upright corner and folded corners 25 in the bottom wall member 14 being of a smooth continuous configuration without any pits, cracks, or impurities which is the important end product of this invention and produced by the new and novel method of production described hereinafter.

Figure 8:
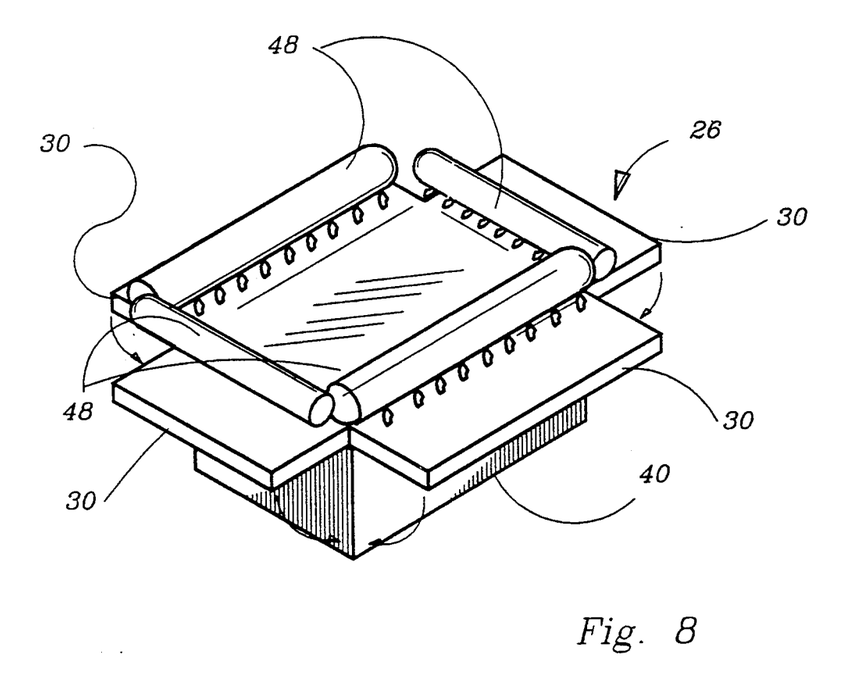
FIG. 8 is a perspective view illustrating an adjustable and indexing table member utilized to hold the quartz plate of FIG. 3a thereon.

The quartz tank member 4 is produced from a continuous quartz plate 26 from a process step as noted in FIG. 8. This quartz plate 26 has been initially cut as noted in FIG. 3a with interior 90 degree corners having equally distanced side wall members 16, 18 and end wall members 20, 22. The quartz plate 26 can be bent as shown in FIG. 8 having outer edge walls 30 which would lie in a common horizontal plane to achieve the quartz tank member 4 as noted in FIG. 1.

The quartz plate 26 is produced from fused quartz crystals or crystalline silica (sand or rock) achieved at high temperature such as 1900 C. degrees. After the fusion process, this mass is severed into quartz sheets or plates.

The quartz plate 26 is impermeable substantially to all gases at room temperature which is important in the manufacturing process involving silicon wafer assemblies.

Further, the quartz plate 26 is important in the manufacture of the quartz tank member 4 as fused quartz contains less than 50 PPM with clear quartz plate 26 used in this method of production having a normal purity of 99.995 percent.

An alternative method of production would be to utilize the quartz plate 26, as noted in FIG. 3b, having separate ones of the side wall members 16, 18 and end wall members 20, 22 so as to be welded together to achieve the quartz tank member 4 of FIG. 1 in a method of production to be described.

One other method of production would be to utilize the quartz plate 26 in a form as noted in FIG. 3c having a central plate member 32 which can be folded along two aligned areas to form folded corners 25 and utilized with the side wall members 16, 18 during a bending and welding process in a method of production to be described.

In numerous important process steps of this invention, a specially designed quartz heating torch tool 48 is used to provide a continuous elongated heat source or flames 36 as noted in FIG. 4.

The quartz heating torch tool 48 uses a mixture of hydrogen and oxygen gas to achieve a "white hot" condition along a bent corner 25 to be folded on the quartz plate 26 with the flame 36 achieving a temperature of 1550 to 1750 C. degrees.

Further, in the method of production of this invention, a quartz torch assembly 34 is used in conjunction with a quartz welding rod assembly 37 to produce welded seams as will be explained. Preferably, the small rod members 39 are approximately half the diameter of the large rod members 38.

The quartz torch assembly 34 uses a mixture of hydrogen and oxygen gas to produce a high temperature flame for heating the quartz plate 26 to a temperature of 1550 to 1750 C. degrees.

Another important element needed for the method of production of this invention is an adjustable support and indexing table 40 having a top plate support surface 42 to receive the quartz plate 26 thereon for support in a position during the glass bending process steps of this invention.

The adjustable support and indexing table 40 is provided with numerous adjustable stop members 44 and clamp assemblies 46 on all sides thereof to abut a bending side wall member 16, 18 or an end wall member 20, 22 of the quartz plate 26 during a method of production as will be explained.

The top plate support surface 44 is designed to be expandable and contracted in all four directions in a horizontal plane providing vertical support to the quartz plate 26 along the bent corner 25 in a process step as will be explained.

As noted in FIG. 5, the clamp assemblies 46 are of a conventional nature utilized to releasably engage the bottom wall member 14 of the quartz plate 26 and connected to the adjustable support and indexing table 40 during a folding step operation.

The glass torch assembly 34 is utilized similar to a butane torch flame whereupon only a small area of the quartz plate 26 can be heated to form a welded seam and, therefore, the quartz torch assembly 34 is moved continuously back and forth along an area to be welded. This is unsatisfactory as produces numerous wavy weld configurations from use of the quartz welding rods 37 which creates irregularities, hills, and valleys which is not present in the production of the quartz tank member 4 without the grinding process step of this invention.

In the method of production of this invention, a hand grinding tool assembly 50 is utilized having a rotating outer grinding head member 52 which, more specifically, is provided with a diamond ball head 54 of circular shape used to grind and smooth to obtain the seams 24 achieved in this invention.

Further, during the method of production of the quartz tank member 4 of this invention, a belt sander member is utilized having an outer rotating belt member with an outer hardened surface constructed of a silicone carbide, aluminum oxide, or diamond material. This is necessary to achieve a smoothing, grinding operation and to achieve an outer arcuate surface of the seams 24 in a manner to be explained.

The method of production of the quartz tank member 4 utilizes a lapping wheel assembly 60 having a disc member 62 rotatable about a vertical axis. The rotating disc member 62 is provided with an outer disc surface 64 with a hardened surface constructed of a silicone carbide, aluminum oxide, or diamond material and necessary to achieve a grinding and smoothing of the quartz plate 26 and the quartz welded seams 24 in the exterior welded corners.

The method of production to achieve the quartz tank member 4 of this invention involves numerous steps utilizing the quartz tank member 4, either in a continuous sheet as noted in FIG. 3, five elements noted in FIG. 3b, or three elements noted in FIG. 3c.

We will utilize the continuous quartz plate 26, as noted in FIG. 3a, to fully describe the method of production to achieve the quartz tank member 4 as noted in FIG. 1. The process steps are as follows:

1) placing the continuous quartz plate 26 of FIG. 3a on the adjustable support and indexing table 40 being supported on the top plate support surface 42 and moving the quartz plate 26 to a position to place an aligned area to be folded into a folded corner 25 as shown in FIG. 4. At this time, the clamp assembly 46 is used to clamp the quartz plate 26 to the adjustable support and indexing table 40 to assure non-movement of the quartz plate 26 during the folding process step (FIG. 5);

2) applying heat from the quartz heating torch tool 48 having a continuous flame 36 emitted therefrom applied to a seam line on an upper surface of the quartz plate 26. The heat source from the quartz heating torch tool 48 is preferably in the range of 1550 to 1750 C. degrees which achieve a condition known as "white hot" which begins to soften the quartz plate 26. The application of heat from the quartz heating torch tool 48 is applied until there is a downward movement or bending of the quartz plate 26 to achieve the bent corner as noted in FIG. 5;

3) removing the, heat source through the quartz heating torch tool 48 after a bending movement of the side wall member 18 to approximately 75 degrees relative to the bottom wall member 14 as noted in FIG. 5. This movement is caused by softening of the quartz plate 26 and force of gravity and, after removal of the heat, the side wall member 18 continues to move downward to engage one of the adjustable stop members 44 forming a 90 degree interior corner with the side wall member 18 perpendicular to the bottom wall member 14 being a bent corner 25;

4) annealing with the quartz plate 26 with the bent corner 25 in an annealing oven which reaches a temperature of 1200 degrees C. to remove stresses formed within the quartz plate 26 during the heating and folding process step.

5) adjusting the adjustable quartz support and indexing table 40 and, specifically, the top plate support surface 42 as required to place another portion of the quartz plate 26 to be folded in the position of FIG. 5. Then, repeating the steps of applying heat from the quartz heating torch tool 48, removing the heat source, and annealing the folded corner 25 achieved thereby in the annealing oven as described in steps 2, 3, and 4.

Figure 7:
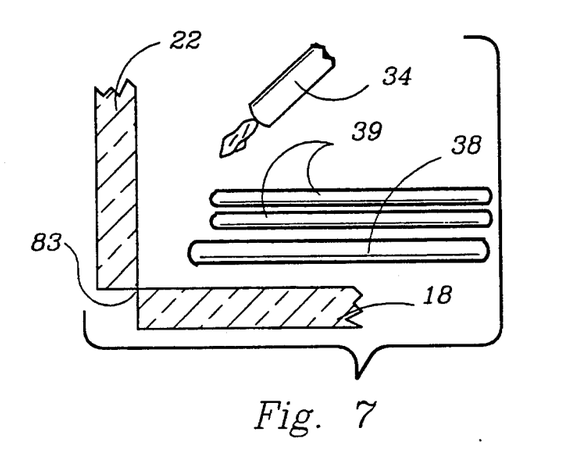
FIG. 7 is an enlarged fragmentary sectional view taken along line 7—7 in FIG. 6d.

6) adjusting the adjustable support and indexing table 40 in step 5, applying the heating process steps 2 and 3, and proceeding with the annealing step 4 in an annealing oven to remove stresses from the newly formed bent corners 25 to achieve the final bent condition after heating and annealing as noted in FIG. 6d. This creates upright, abutting corner edges 83 from the bent corners 25 as noted in FIG. 7;

7) welding of the abutting corner edges 83 as noted in FIG. 7 involving the following welding process steps:

a) applying an exterior welded bead 68 to outer adjacent edges of a bent corner 25 with use of a large rod member 38 and the quartz torch assembly 34 as shown in FIG. 9a;

b) applying an interior welded bead 70 utilizing a large rod member 38 and the quartz torch assembly 34 to fill the abutting corner edges 83 as shown in FIG. 9b.

c) applying a first small rod member 39 and applying a heat source thereto from the quartz torch assembly 34 to create a small welded bead 72 abutting the interior welded bead 70 as shown in FIG. 9c;

d) applying a second small rod member 39 and applying a heat source from the quartz torch assembly 34 to achieve a second small welded bead 72 on an opposite side of the interior welded bead 70 as shown in FIG. 9d; and e) applying heat to the interior welded bead 70 and the abutting small welded beads 72 to flow in a molten state and cool to create an irregular welded bead 74 shown in FIG. 9e. This forms the irregular welded bead 74 provided with outer arcuate convex sections 76 integral with a central concave section 78 completely filling the corner area of the abutting side wall member 18 and the end wall member 22.

8) annealing the welded bead 74 achieved in step 7 by placing an annealing oven at the temperature of approximately 1200 degrees C. It will be necessary to apply the annealing process step after each welding process step to form a welded bead 74 to remove the stresses therein and prevent cracking of the quartz plate 26;

If the welded beads 74 are created concurrently on the abutting corner edges 83 in the bent condition as shown in FIG. 6d, then a single annealing process step can be used to remove stresses concurrently in the four welded beads 74.

Figure 10:
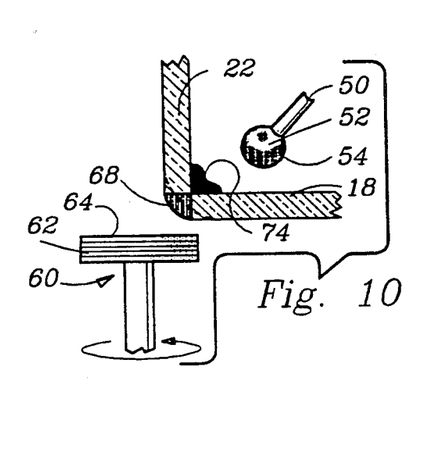
FIG. 10 is the sectional view of FIG. 9e illustrating a grinding process step applied to the welded structure achieved in FIG. 9e.

9) grinding the interior welded beads 74 achieved through the welding process step 7 after the annealing process step 8 through use of the hand grinding tool assembly 50 and, more specifically, the grinding head member 52 with the diamond ball head 54 as noted in FIG. 10.

Figure 11:
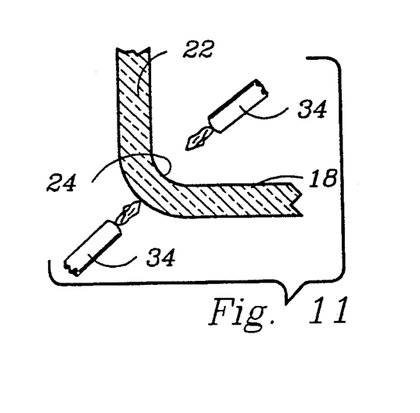
FIG. 11 illustrates the result of the grinding illustrated in the sectional view of FIG. 9e and the application of a heat source during a fire polishing process step.
Figure 12:
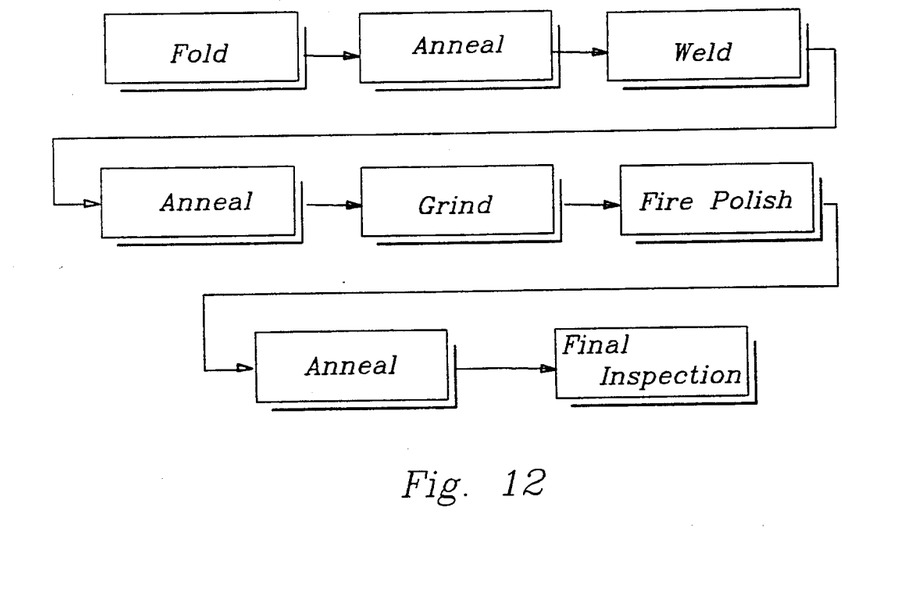
FIG. 12 is a schematic diagram illustrating the method of production of the quartz tank member of this invention.

Concurrently, the belt sander member and/or the lapping wheel assembly 60 is utilized to achieve a grinding and smoothing action on an outer surface of the exterior welded bead 68 to achieve the finished arcuate corner configuration as shown in FIG. 11;

10) fire polishing all areas of the quartz tank member 4 adjacent the welded seams 24 to remove oxidation residue known as "quartz white" which is deposited thereon during the weld process step 7. This achieves a clear glass appearance of the quartz tank member 4;

11) annealing the finished product of the quartz tank member 4 to relieve any stresses therein created during the fire polishing process step 10;

12) inspecting the final quartz tank member 4 produced through the previously described numerous process steps to verify that continuous smooth inner and outer surfaces at the welded seams 24 have been achieved having no hills, valleys, pits, crevasses, or irregularities thereon.

This final inspection step can be achieved through optical or electronic equipment to assure that a continuous smooth polished surface has been achieved.

The method of production of the quartz tank member of this invention achieves a structure having uniform arcuate inner contoured corner surfaces which cannot be achieved by the prior art process steps and is extremely important in the use of the quartz tank members in production of silicon wafer assemblies to prevent contamination and subsequent destruction thereof.

Use of the quartz plate 26, with its unique qualities and characteristics, requires a new and novel method of production with numerous process steps not being utilized in the industry and production of the quartz tank member of this invention is a substantial improvement over prior art quartz tanks.

While the invention has been described in conjunction with preferred specific embodiments thereof, it will be understood this description is intended to illustrate and not to limit the scope of the invention, which is defined by the following claims:

We claim:

1. A method of production to create a quartz tank member from a piece of quartz plate comprising the following steps:
    a) cutting the quartz plate into a shape having a central bottom wall member integral with laterally extended side wall members and end wall members with areas to be bent;
    b) mounting the quartz plate on a support member for support along the areas to be bent;
    c) heating the areas to be bent to soften the quartz plate to allow movement under the force of gravity of the side wall members and end wall members in a common direction perpendicular to the bottom wall member to achieve bent corners with the wall members having abutting corner edges;
    d) annealing the quartz plate to remove stresses therein;
    e) welding the abutting corner edges to create an internal welded bead and abutting smaller welded beads to create an irregular internal welded bead;
    f) annealing the quartz plate to remove stresses created in the welding step; and
    g) grinding the irregular welded bead to remove hills and valleys and create smooth welded corner areas.

2. A method of production as described in claim 1, further comprising:
    a) clamping the quartz plate to the support member which is a support and indexing table; and
    b) placing the areas to be bent along an edge of the support and indexing table before the clamping step as set forth in a) above and the heating step as set forth in c) in claim 1.

3. A method of production as described in claim 1, wherein:
    a) heating in step c) is with an elongated heat source simultaneously along the entire length of the areas to be bent by a heating torch tool.

4. A method of production to create a quartz tank member from a quartz plate comprising the following process steps:
    a) supplying the quartz plate in the form of separate ones of a bottom wall member, side wall members, and end wall members with abutting corner edges of the side wall members and end wall members to be secured by welding to each other and to be secured by welding at abutting corner edges to the bottom wall member;
    b) mounting the bottom wall member on a support member with the side wall members and end wall members abutting and extending perpendicular to each other and to the bottom wall member with abutting corner edges to be secured by welding to each other;
    c) welding the abutting corner edges to form an internal welded bead and abutting smaller welded beads to create an irregular welded bead;
    d) annealing the quartz plate to remove stresses created in the welding step; and
    e) grinding the irregular welded bead to remove hills and valleys and create smooth welded corner areas.

5. A method of production as described in claim 4, wherein:
    a) after welding of each separate abutting corner edge of the bottom wall to the side wall members and the end wall members and welding abutting corner edges of the side wall members and end wall members to each other, annealing the quartz plate to remove stresses created in the welding step c).

6. A method of production as described in claim 4, wherein:
    a) heating in step c) is with an elongated heat source simultaneously along the entire length of the abutting corner edges by a heating torch tool.

7. A method of production to create a quartz tank member from a piece of quartz plate comprising the following process steps:
    a) cutting the quartz plate into a shape having a central bottom wall member with integral laterally extended side wall members and end wall members with areas to be bent;
    b) mounting the quartz plate on a support member for support along the areas to be bent;
    c) heating the areas to be bent to soften the quartz plate to allow movement under the force of gravity of the side wall members and end wall members in a common direction perpendicular to the bottom wall member to achieve bent corners with the wall members having abutting corner edges;
    d) annealing the quartz plate to remove stresses therein;
    e) welding the abutting corner edges to create a central internal quartz welded bead and abutting smaller welded beads to form an internal irregular welded bead for grinding into a smooth welded corner area;
    f) annealing the quartz plate to remove stresses created in the welding step; and
    g) grinding the welded beads to remove hills and valleys and create smooth welded corner areas.

8. A method of production to create a quartz tank member from a quartz plate comprising the following process steps:
    a) supplying the quartz plate in the form of separate ones of a bottom wall member, side wall members, and end wall members with abutting corner edges of the side wall members and end wall members to be secured to each other by welding and to be secured by welding at abutting corner edges to the bottom wall member;
    b) mounting the bottom wall member on a support member with the side wall members and end wall members abutting and extending perpendicular to each other and to the bottom wall member with abutting corner edges to be secured by welding to each other;
    c) welding the abutting corner edges to form a central internal quartz welded bead and abutting smaller welded beads to form an internal irregular welded bead for grinding into a smooth welded corner area;

d) annealing the quartz plate to remove stresses created in the welding step; and e) grinding the irregular welded bead to remove hills and valleys and create smooth welded corner areas.

9. A method of production to create a quartz tank member from a piece of quartz plate comprising the following process steps:

a) cutting the quartz plate into a shape having a central bottom wall member integral with wall members extended laterally from the central bottom wall member and the wall members having areas to be bent;

b) mounting the quartz plate on a support and indexing table for support along the areas to be bent;

c) heating the areas to be bent to soften the quartz plate to allow movement under the force of gravity of the side wall members in a common direction perpendicular to the bottom wall member to achieve bent corners with the wall members having corner edges which abut with each other;

d) welding the abutting corner edges to create internal welded beads;

e) grinding the internal welded beads to remove hills and valleys and create smooth welded corner areas; and f) on welding the abutting corner edges as set forth in step d), forming a central internal quartz welded bead and abutting smaller welded beads to form an internal irregular welded bead for grinding into smooth welded corner areas.

10. A method of production to create a quartz tank member from a quartz plate comprising the following process steps:

a) supplying the quartz plate with a bottom wall member integral with side wall members or end wall members in a single quartz plate and separate side wall members or end wall members;

b) mounting the bottom wall member on a support member to support along opposed parallel areas to be bent;

c) heating the areas to be bent with an elongated heat source by a heating torch tool to soften the quartz plate to allow movement under the force of gravity of the side wall members or end wall members in a common direction perpendicular to the bottom wall member to achieve bent corners;

d) placing the separate side wall members or end wall members in an abutting position with the bottom wall member and the end wall members or side wall members which were bent perpendicular to the bottom wall member in step c) to form abutting corner edges;

e) welding the abutting corner edges to form an internal welded bead and abutting smaller welded beads to create an irregular welded bead;

f) annealing the quartz plate to remove stresses created in the welding step; and g) grinding the irregular welded bead to remove hills and valleys and create smooth welded corner areas.

* * * * *